UNITED STATES PATENT OFFICE.

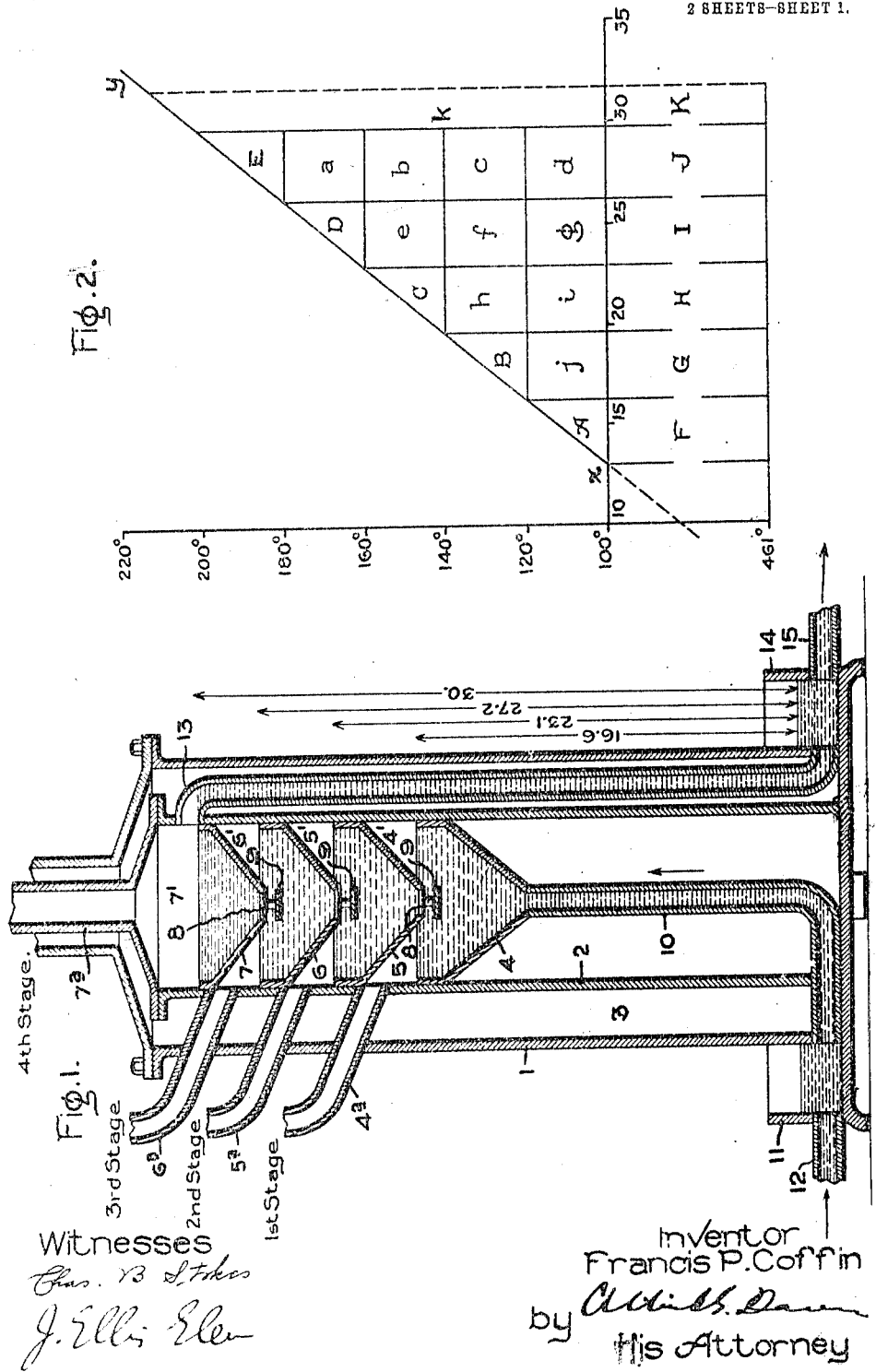

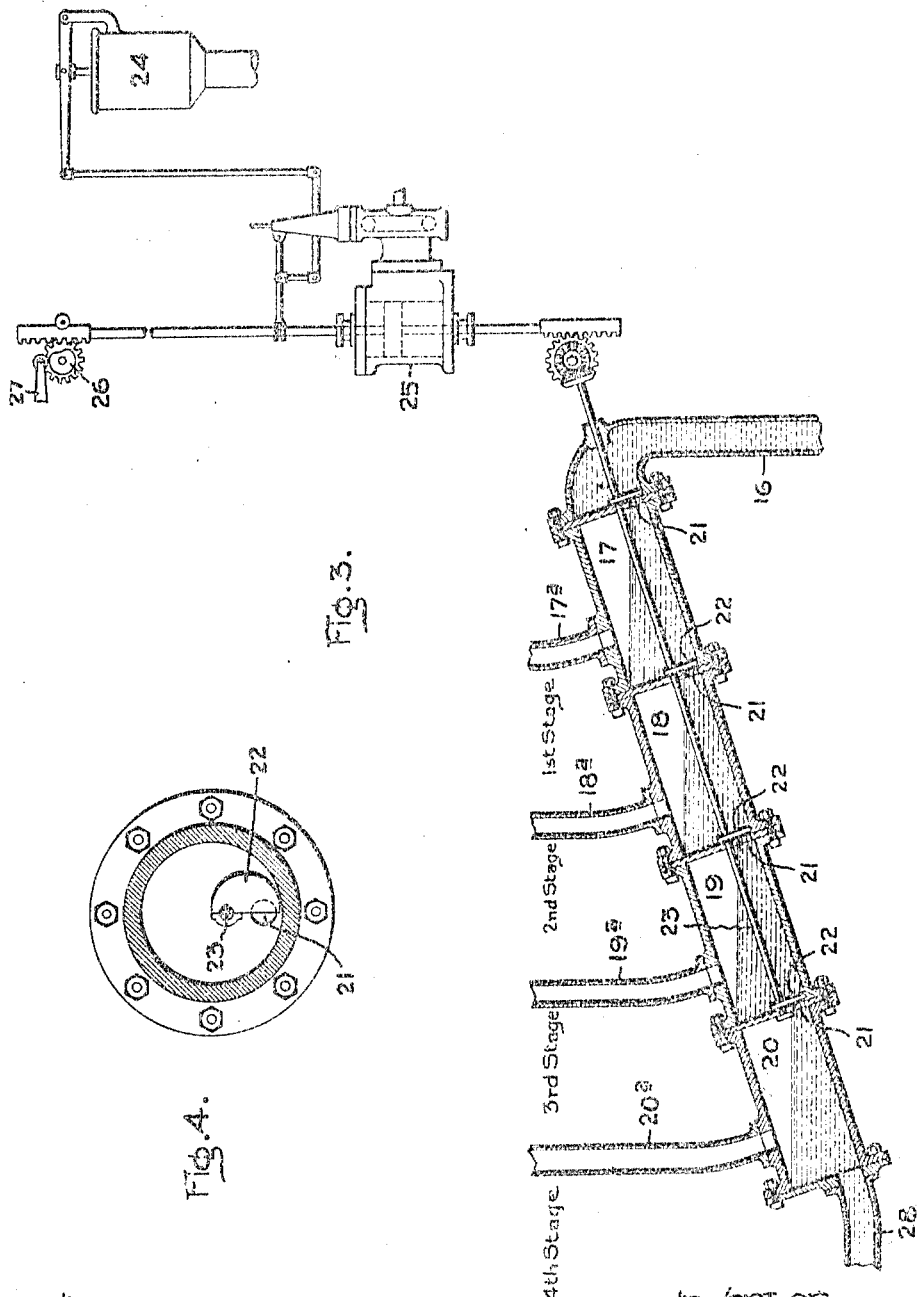

FRANCIS P. COFFIN, OF SCHENECTADY, NEW YORK, ASSIGNOR TO GENERAL ELECTRIC COMPANY, A CORPORATION OF NEW YORK.

LOW-PRESSURE STEAM-GENERATOR.

1,105,405.   Specification of Letters Patent.   Patented July 28, 1914.

Application filed August 10, 1912. Serial No. 714,371.

*To all whom it may concern:*

Be it known that I, FRANCIS P. COFFIN, a citizen of the United States, residing at Schenectady, county of Schenectady, State of New York, have invented certain new and useful Improvements in Low-Pressure Steam-Generators, of which the following is a specification.

This invention relates to apparatus for the generation of steam at low pressure for use is a low pressure turbine, and its object is to provide a simple and inexpensive device capable of generating steam from hot water.

The invention is intended more particularly for use in connection with solar water heaters, but it is not necessarily limited to such systems.

It has been proposed heretofore to run a low pressure turbine with hot water by expanding the water during its passage through the nozzles from atmospheric pressure to a 28 inch vacuum, thereby flashing about ten per cent. of its volume into steam. This was expected to give a jet of steam and water spray in a homogeneous mixture. A surface condenser would be used to return the water to the heater at about 102 degrees Fahrenheit; the original temperature of the water being 202 degrees Fahrenheit. Such a project appears to me to be impractical, on account of the fluid friction, in the turbine and the great size of the surface condenser required for a turbine of a given output. My invention aims to avoid these difficulties by separating the water and steam before the latter enters the turbine, the percentages being about 90 for the water and 10 for the steam. This method permits the use of either a barometric or a jet condenser for the exhaust steam, while the water returns to the heater without unnecessary loss of its remaining sensible heat.

The steam is separated by allowing the hot water to rise through a barometric column, with as many free surfaces at different levels as there are stages in the turbine, the space above said surface being connected with its respective stage. Steam is disengaged at each surface and is fed to its appropriate stage through an independent set of nozzles; the lower stages having additional nozzles for the exhaust steam from the upper stages. The inlet valves for governing may be distributed among the independent inlets to the several stages.

After being filled with hot water, the circulation in my barometric steam generator is automatic. The steam bubbles reduce the density of the rising column, while the overflow column consists of solid heavier water which acts as a thermo-siphon to assist the circulation. If a solar heater is used, this down-flow column may give enough heat to circulate the water through the heater and storage tank.

In the accompanying drawings, Figure 1 is a vertical section of one form of my steam generator; Fig. 2 is a diagram showing the temperature range and energy available for a four stage generator and turbine; Fig. 3 is a diagrammatic view of another form of generator; and Fig. 4 is a cross-section thereof on a larger scale.

The generator illustrated in Fig. 1 has an outside jacket 1, inside of which is a casing 2, both being preferably cylindrical and having between them a space 3 which may be simply an air-space or may be filled with heat-insulating material. A tier of open receptacles fills the upper part of the casing, the number depending upon the number of stages in the turbine to be supplied with steam. The drawing shows four receptacles, 4, 5, 6 and 7, preferably hopper-shaped, with an opening 8 at the bottom. The lower end of each of the three uppermost receptacles 5, 6, 7 dips below the upper edge of the one below, and its opening is protected by a baffle-plate 9. The bottom of the lowest receptacle 4 is connected to a pipe 10 whose lower end extends out through one side of the casing 2 and jacket 1 into an open tank 11 to which the hot water is fed by a pipe 12.

The receptacles fit the casing fluid-tight forming chambers 4', 5', 6', 7' above the respective hoppers. From each chamber leads a pipe 4ª, 5ª, 6ª, 7ª to the respective stages of the turbine, pipe 4ª supplying the first or highest pressure stage, and so on.

The height of each chamber above the level of the water in the tank 11 depends upon the desired ratios between the stage pressures.

The diagram, Fig. 2, assumes the first stage temperature to cover a drop of twenty degrees, from 200 to 180. The absolute pressure corresponding with 180 degrees is 7.51 pounds. Atmospheric pressure being 14.7 pounds to the square inch, the difference, or 7.19 pounds, represents the weight of the column of hot water having a cross section of one square inch which under a vacuum will yield steam at 180 degrees. As the weight of a column of water one foot in height and one inch square is .433 pounds, it follows that the level of the water in receptacle 4 must be 16.6 feet above the level of the water in the tank 11. By a similar process, the heights of the other receptacles can be ascertained, assuming a drop of twenty degrees between stages, the heights being shown in Fig. 1 to be 23.1 feet for receptacle 5; 27.2 feet for receptacle 6, and 30 feet for receptacle 7. The absolute pressures for the four stages will be 7.51; 4.787; 2.885; 1.689.

From chamber 7' an overflow pipe 13 descends to a hot well 14 at the bottom of the apparatus, in which the water stands at the same level as in tank 11. An escape pipe 15 carries off the surplus water to be re-heated.

The vacuum established by the condenser attached to the turbine causes the hot water to rise in the pipe 10 and the tier of receptacles almost to barometric height, as shown, and the steam liberated in each chamber 4', etc., is led off by the pipe 4ª, etc., to the respective stages of the turbine. The action of the condenser in maintaining the barometric column is assisted by the thermo-siphon action of the down-flow pipe 12. The baffle-plates 9 prevent too rapid movement of the water and the establishment of a current of hot water directly through the centers of the receptacles.

Fig. 2 shows a thermal diagram for a four-stage steam generator and turbine. The temperature range of operation is assumed to be from 200 degrees Fahrenheit to 100 degrees, with a uniform drop of 20 degrees per stage. Since the entropy-temperature curve $x y$ is nearly a straight line, the diagram may be divided into approximately equal rectangles and triangles for each stage. The rectangles $a$ to $j$ represent most of the available energy of the steam, while the triangles A to E represent energy which would be available in a piston engine, or in a turbine with an infinite number of stages, but 97 per cent. of which goes to the exhaust in this case. Here the actually available energy is $$\frac{10}{12.5} + .03 \frac{2.5}{12.5} = 0.815$$

of the energy theoretically available over the given range. The available energy per pound of steam per stage is 24 B. T. U., which should give a jet velocity of 1100 feet per second, and allow the use of one turbine wheel per stage. The first stage utilizes the energy represented by the rectangles $a$ to $d$; the second stage, rectangles $e f g$ and so on. Of course, other arrangements can be made, such as dividing the steam between two separate turbines, say, each with two stages. Thus rectangle $a$ may be used in a single stage wheel, and rectangles $b$ to $g$, inclusive, in a two wheel stage, in one turbine, while rectangle $h$ would be used in a single wheel stage and $i$ and $j$ in a second single wheel stage on another machine, or these can all be put on one shaft.

Rectangle $k$ represents additional energy available when water can be obtained at 212 degrees, while rectangles F to K represent heat going to the condensing water. The theoretical thermo-dynamic efficiency is 7.5 per cent. when cooling the water in the steam generator by evaporation from 200 degrees to 120 degrees, at which temperature it returns to the heater. This allows 12 degrees loss from the boiling point for piping and storage.

An alternative method of generating low pressure steam is to throttle the hot water while allowing it to pass through a valve or port from a compartment under atmospheric pressure to one under a partial vacuum. We will assume a pressure in the second compartment of 3.7 pounds per square inch absolute, at which the boiling point will be 150° F.—this being midway between our initial and final temperatures. The available energy in the steam will then be represented by a single rectangle of about 50% of the area of the triangle in Fig. 2, as against 81.5% in the case of 4-stage steam generation. The idea of multi-stage steam generation, however, may be applied to the case of throttling also.

In the apparatus shown in Figs. 3 and 4, the hot water is supplied by the pipe 16 to the uppermost of an inclined series of compartments, 17, 18, 19, 20, which communicate by means of ports 21. Admission to the first compartment, and from one to another through the ports 21 is controlled by the valves 22 all controlled simultaneously, preferably by means of a common shaft 23 on which they may be secured. The flow of water and consequently the rate of steam production is governed by a speed-responsive device 24 driven by the turbine and acting on the shaft 23 through a hydraulic motor 25 of well known construction; by means of which also the steam admission valves of the turbine are regulated, as by cams 26 and levers 27. From each compartment a pipe 17ª, 18ª, 19ª, 20ª leads to the respective stage of the turbine. The pressure in each compartment depends upon the amount of throttling effected by the valves 22 between the compartments. The cooled water from which the steam has evaporated escapes by a pipe 28 and may be returned to the heater. This latter apparatus is not confined in its application to generating low pressure steam. Hot water may be pumped into a storage tank under boiler pressure during the hours of light load, in a steam power station, and stored until the peak load comes on. Multistage throttling may then be applied in connection with feed pipes leading to the various stages of a high pressure turbine.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. Means for generating steam from hot water which comprises a plurality of chambers, means for simultaneously passing hot water through them in series and leading off steam from successive chambers for utilization in the respective stages of a multi-stage turbine.

2. Means for generating steam from hot water which comprises a plurality of chambers, means for passing hot water through them in series, and means for leading off from successive chambers steam of successively lower pressures for utilization in the successive stages of a multi-stage turbine.

3. Apparatus for generating steam at low pressure, consisting in means for maintaining a barometric column of hot water, and means for drawing off steam from said column at different levels corresponding with the stages of a low-pressure turbine.

4. Apparatus for generating steam from hot water comprising a series of communicating receptacles arranged at different levels, means for maintaining a barometric column of hot water in said receptacles, and means for drawing off steam from said receptacles at pressures which increase respectively from the lowest to the highest thereof.

5. Apparatus for generating steam from hot water which consists in means for feeding said hot water through a barometric column, chambers at different levels communicating with said column and in which the steam evaporates at different pressures, pipes for leading off the steam from said chambers and a down-flow pipe from the upper chamber to a hot well, said down-flow column of water exerting a thermo-siphon action.

6. The combination with a casing, of a tier of hopper-shaped receptacles fitting tightly therein, the lower end of each dipping slightly below the level of the top of the one below, a feed pipe entering the bottom of the lower receptacle, a down-flow pipe entering the chamber above the upper receptacle, and steam pipes communicating with the chambers above said receptacle, the height of the apparatus being such that a column of hot water can be maintained in said feed pipe and tier of receptacles by barometric pressure.

7. Apparatus for generating steam from hot water at pressures corresponding with predetermined temperature drops, which consists in means for feeding said water up through a barometric column, and chambers communicating with said column at levels determined by the difference between atmospheric pressure and the absolute pressures at the temperatures assumed.

In witness whereof, I have hereunto set my hand this 9th day of August, 1912.

FRANCIS P. COFFIN.

Witnesses:
BENJAMIN B. HULL,
HELEN ORFORD.